United States Patent
Marathe et al.

(10) Patent No.: US 9,424,015 B2
(45) Date of Patent: Aug. 23, 2016

(54) SYSTEM AND METHOD FOR OPTIMIZING SOFTWARE TRANSACTIONAL MEMORY OPERATIONS USING STATIC CACHING OF MEMORY OBJECTS

(75) Inventors: Virendra J. Marathe, Florence, MA (US); Aleksandar Dragojević, Lausanne (CH); Tito L. Autrey, III, Champaign, IL (US)

(73) Assignee: Oracle International Corporation, Redwood City, CA (US)

( * ) Notice: Subject to any disclaimer, the term of this patent is extended or adjusted under 35 U.S.C. 154(b) by 977 days.

(21) Appl. No.: 13/023,402

(22) Filed: Feb. 8, 2011

(65) Prior Publication Data

US 2012/0204163 A1    Aug. 9, 2012

(51) Int. Cl.
 *G06F 9/45* (2006.01)
(52) U.S. Cl.
 CPC .................... *G06F 8/4442* (2013.01)
(58) Field of Classification Search
 CPC ........... G06F 9/52; G06F 9/466; G06F 9/467
 See application file for complete search history.

(56) References Cited

U.S. PATENT DOCUMENTS

| | | | |
|---|---|---|---|
| 2009/0031310 A1* | 1/2009 | Lev et al. | 718/101 |
| 2009/0249318 A1* | 10/2009 | Ayguade et al. | 717/151 |
| 2010/0162250 A1* | 6/2010 | Adl-Tabatabai et al. | 718/101 |

OTHER PUBLICATIONS

Lowering STM overhead with Static Analysis. Yehuda Afek, Guy Korland, and Arie Zilberstein. The 23rd International Workshop on Languages and Compilers for Parallel Computing (LCPC2010). Oct. 7-9, 2010.
Tim Harris, Mark Plesko, Avraham Shinnar, and David Tarditi. 2006. Optimizing memory transactions. In Proceedings of the 2006 ACM SIGPALN conference on Programming language design and implementation (PLDI '06). ACM, New York, NY, USA, pp. 14-25.
Ali-Reza Adl-Tabatabai, Brian T. Lewis, Vijay Menon, Brian R. Murphy, Bratin Saha, and Tatiana Shpeisman. 2006. Compiler and runtime support for efficient software transactional memory. In Proceedings of the 2006 ACM SIGPLAN conference on Programming language design and implementation (PLDI '06). ACM, New York, NY, USA, pp. 26-37.

(Continued)

*Primary Examiner* — Li B Zhen
*Assistant Examiner* — Lenin Paulino
(74) *Attorney, Agent, or Firm* — Robert C. Kowert; Meyertons, Hood, Kivlin, Kowert & Goetzel, P.C.

(57) ABSTRACT

Systems and methods for optimizing transactional memory operations may employ static analysis of source code and static caching of memory objects to elide redundant transactional accesses. For example, a compiler (or an optimizer thereof) may be configured to analyze code that includes an atomic transaction to determine if any read accesses to shared memory locations are dominated by a previous read or write access to the same locations and/or any write accesses to shared memory locations are post-dominated by a subsequent write access to the same locations. Any access within a transaction that is determined to be redundant (e.g., any access other than the first read of a given shared memory location from within the transaction or the last write to a given shared memory location from within the transaction) may be replaced (by the compiler/optimizer) with a non-transactional access to a cached shadow copy of the shared memory location.

20 Claims, 10 Drawing Sheets

(56) References Cited

OTHER PUBLICATIONS

Code Generation and Optimisation for Transactional Memory Constructs in an Unmanaged Language. Cheng Wang, Wei-Yu Chen, Youfeng Wu, Bratin Saha, and Ali-Reza Adl-Tabatabai. International Symposium on Code Generation and Optimization, 2007 (CGO '07). Mar. 2007 pp. 34-48.

Yang Ni, Adam Welc, Ali-Reza Adl-Tabatabai, Moshe Bach, Sion Berkowits, James Cownie, Robert Geva, Sergey Kozhukow, Ravi Narayanaswamy, Jeffrey Olivier, Serguei Preis, Bratin Saha, Ady Tal, and Xinmin Tian. 2008. Design and implementation of transactional constructs for C/C++. In Proceedings of the 23rd ACM SIGPLAN conference on Object-oriented programming systems languages and applications (OOPSLA '08). ACM, New York, 17 pages.

Aleksandar Dragojevic, Yang Ni, and Ali-Reza Adl-Tabatabai. 2009. Optimizing transactions for captured memory. In Proceedings of the twenty-first annual symposium on Parallelism in algorithms and architectures (SPAA '09). ACM, New York, NY, USA, pp. 214-222.

Michael F. Spear, Maged M. Michael, Michael L. Scott, and Peng Wu. 2009. Reducing Memory Ordering Overheads in Software Transactional Memory. In Proceedings of the 7th annual IEEE/ACM International Symposium on Code Generation and Optimization (CGO '09). IEEE Computer Society, Washington, DC, USA, pp. 13-24.

Calin Cascaval, Colin Blundell, Maged Michael, Harold W. Cain, Peng Wu, Stefanie Chiras, and Siddhartha Chatterjee. 2008. Software Transactional Memory: Why Is It Only a Research Toy?. ACM Queue 6, 5 (Sep. 2008), pp. 46-58.

Draft Specification of Transactional Language Costructs for C++, Version 1.0. Editors: Ali-Reza Adl-Tabatabai and Tatiana Shpeisman, 31 pages., Aug. 4, 2009.

Transactional Locking II. Dave Dice, Ori Shalev, and Nir Shavit. In Proceedings of the 20th International. Symposium on Distributed Computing 2006 (DISC 2006), 15 pages.

Michael F. Spear, Luke Dalessandro, Virendra J. Marathe, and Michael L. Scott. 2009. A comprehensive strategy for contention management in software transactional memory. In Proceedings of the 14th ACM SIGPLAN symposium on Principles and practice of parallel programming (PPoPP '09). ACM, New York, NY, USA, pp. 141-150.

Michael F. Spear, Maged Michael, and Christoph von Praun: RingSTM: Scalable Transactions with a Single Atomic Instruction. In: Proceedings of the 20th ACM Symposium on Parallelism in Algorithms and Architectures (SPAA 2008), 10 pages.

A Qualitative Survey of Modern Software Transactional Memory Systems. Virendra J. Marathe and Michael L. Scott. University of Rochester, 2004 Tech. Report # TR 839, 20 pages.

Yosi Lev, Victor Luchangco, Virendra J. Marathe, Mark Moir, Dan Nussbaum and Marek Olszewski: Anatomy of a Scalable Software Transactional Memory. In: Proceedings. of the 4th ACM SIGPLAN Workshop on Transactional Computing (Transact 2009). Raleigh, NC (Feb. 2009), 10 pages.

Dave Dice and Nir Shavit: TLRW: Return of the Read-Write Lock. In: Proceedings of the 4th ACM SIGPLAN Workshop on Transactional Computing. Raleigh, NC (Transact 2009), 9 pages.

Vijay Menon, Steven Balensiefer, Tatiana Shpeisman, Ali-Reza Adl-Tabatabai, Richard L. Hudson, Bratin Saha, and Adam Welc. Single global lock semantics in a weakly atomic STM. In: Proceedings of the 3rd ACM SIGPLAN Workshop on Transactional Computing (Transact 2008). Also published in SIGPLAN Not. 43, 5 (May 2008), 15-26.

Does Transactional Memory Keep Its Promises? Results from an Empirical Study. Victor Pankratius and Ali-Reza Adl-Tabatabai and Frank Otto. University of Karlsruhe, Tech. Report Dec. 2009, 34 pages.

Why STM can be more than a Research Toy. Dragojevic Aleksandar, Felber Pascal, Gramoli Vincent, and Guerraoui Rachid. 2009, 14 pages.

Luke Dalessandro, Michael F. Spear, and Michael L. Scott: NOrec: Streamlining STM by Abolishing Ownership Records. In: Proc. of the 15th ACM SIGPLAN Symposium on Principles and Practice of Parallel Programming (PPoPP 2010). Bangalore, India (Jan. 2010), 11 pages.

\* cited by examiner

SYSTEM AND METHOD FOR OPTIMIZING SOFTWARE TRANSACTIONAL MEMORY OPERATIONS USING STATIC CACHING OF MEMORY OBJECTS

BACKGROUND

Description of the Related Art

With the ongoing multi-core revolution in the computing industry, parallel programming is becoming ubiquitous. Thus, the computing industry needs as many tools as possible to make parallel programming a manageable task for programmers. In that vein, Transactional Memory (TM) is a promising concurrency control technology that aids programmers writing parallel programs to perform correct data sharing between concurrent computations (which commonly manifest as "threads"). Transactional memory is widely considered to be the most promising avenue for addressing issues encountered in concurrent programming and execution. Using transactional memory, programmers may specify what should be done atomically, rather than how this atomicity should be achieved. The transactional memory implementation may then be responsible for guaranteeing the atomicity, largely relieving programmers of the complexity, tradeoffs, and software engineering problems typically associated with concurrent programming and execution. Transactional memory may be implemented in hardware, in software, or in a combination of the two, in various embodiments.

Transactional memory (TM) implementations may provide programmers with the ability to mark blocks of code as transactions (e.g., using a language level construct such as the "atomic { . . . }" block), and the system may ensure that the code is executed atomically and in isolation from concurrently executing transactions. When a region of code is so designated, it should appear as if the section is executed in its entirety or not at all, and it should appear as if the executions of concurrently executing atomic blocks are not interleaved with each other. This capability may dramatically simplify the construction of concurrent programs that are correct, efficient, and scalable, because it relieves programmers of the need to explicitly embed synchronization mechanisms into their application code (for example using mutual exclusion locks to explicitly prevent the concurrent execution of different "critical sections" of code). Typical TM implementations execute atomic blocks of code as "optimistic" transactions, meaning that, rather than preventing concurrent execution, they proceed with the hope that no interference occurs, and have the capability to confirm that this is the case, rolling back the transaction and retrying it in the case that there is interference.

Runtime support for transactional memory has been explored in various contexts, including software-only (STM), hardware-only (HTM), and hardware-software hybrid (HyTM) contexts. However, the HTM implementations proposed to date seem unrealistic for currently available computer architectures. Of the existing HTM proposals, the only viable options, at least in the near future, appear to be the so-called "best-effort" HTMs. In these implementations, the HTM applies its best effort to run a transaction in hardware, and must fall back to a software alternative in case the HTM is unable to successfully commit the transaction in hardware (e.g., because of various resource limitation issues). This means that near-future practical TM runtimes will likely be either fully software or hybrid TMs. In either case, practical TM runtimes will continue to include a dominant STM component.

Although STMs are a viable method of implementing support for memory transactions, they are known to incur significant overhead. For example, in a typical STM implementation, a single load or store to shared memory is transformed (e.g., by a compiler or via library interfaces) into several STM bookkeeping memory loads and stores (including an atomic compare-and-swap instruction in some cases) to enable conflict detection between concurrent transactions. Thus there is a need to incorporate as many optimizations in STMs as possible. The compiler can, and in some existing systems has, helped in this regard. For example, several standard redundancy elimination techniques have been applied to transactional code to significantly reduce the cost of the STM instrumentation. However, some of these existing optimizations are not widely applicable to different STM implementations. For example, some existing optimization techniques were developed for one type of STM implementation (e.g., an STM implementation that employs undo logs), but they may not be as effective, or may even cause incorrect behavior, in other types of STM implementations (e.g., in STM implementations that employ redo logs).

SUMMARY

The systems and methods described herein for optimizing transactional memory operations may employ a static analysis of source code and static caching of memory objects to elide redundant transactional accesses. More specifically, the techniques described herein may be used to elide STM barriers by caching shared data that has already been read and/or modified by a transaction in the host thread's private memory (e.g. on its stack, or in some block of memory local to the host thread). Subsequent reads and writes of the shared data by the transaction may be fulfilled from the cached copy in thread-local memory, thus avoiding the expensive STM read/write barriers typically used to access shared memory from within a transaction.

In some embodiments, a compiler (or an optimizer thereof) may be configured to analyze code that includes an atomic transaction to determine if any read accesses to shared memory locations are dominated by a previous read or write access to the same locations and/or any write accesses to shared memory locations are post-dominated by a subsequent write access to the same locations. Any access within a transaction that is determined to be redundant (e.g., accesses other than the first read of a given shared memory location from within the transaction, without a previous write, or the last write to a given shared memory location from within the transaction) may be replaced (by the compiler/optimizer) with a non-transactional access to a cached shadow copy of the targeted shared memory location. Conversely, the first read of a given shared memory location from within the transaction (without a previous write) and/or the last write to a given shared memory location from within the transaction may be implemented using transactional memory accesses that target the given shared memory location. In some embodiments, the compiler/optimizer may inject code that is executable to reserve a location in thread-local memory for the shadow copy of the targeted memory location the first time an instruction within the transaction targets that shared memory location, and/or to invalidate a shadow copy, under certain conditions.

In some embodiments, a determination of read-after-read, read-after-write, write-after-read, and write-after-write conditions on accesses to shared memory locations (which may enable the compiler to elide STM barrier operations for the latter read/write access) may be performed using existing techniques, such as common sub-expression elimination, loop-invariant hoisting, etc. The STM barrier elision strategy herein may be applied effectively in a wide range of STM runtime designs, including all state-of-the-art STMs, in various embodiments.

Figure 1:
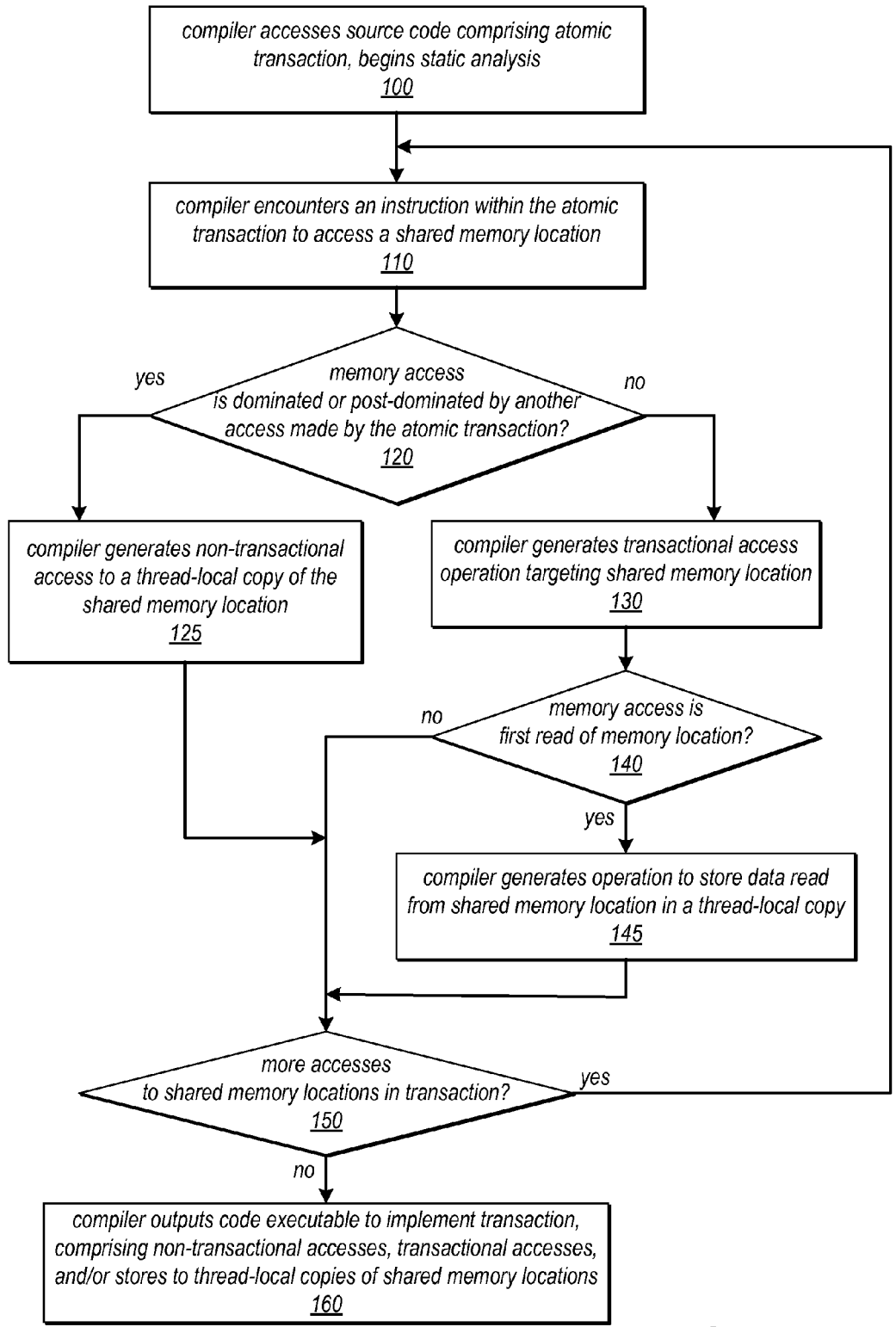
FIG. 1 is a flow diagram illustrating one embodiment of a method for eliding transactional memory accesses by a compiler, as described herein.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, transactional memory is a promising concurrency control technology for parallel programming in the new multi-core era of computing. In the absence of comprehensive hardware support, software-only (STM) or hardware-software hybrid (HyTM) transaction memory systems may continue to be the means to execute memory transactions. However, in various implementations, STMs may incur significant performance overheads, which may undermine their programmability advantages when compared with other concurrency control technologies (e.g. locks). To that end, a fair amount of research is currently underway aimed at optimizing the performance of STMs. In some cases, optimizations performed by a compiler can significantly aid STMs by exploiting the semantics of transactional memory systems to optimize the generated code. The effectiveness of such an approach has been demonstrated by several prior STM compiler optimizations. The systems and methods described herein implement a new compiler optimization strategy, which may further improve the performance of generated code by reducing STM overhead, thus making STM more appealing to the programmers. In contrast to some previous compiler optimizations that are applicable only to a small set of STM runtimes (e.g., to STMs based on undo logs), the optimizations described herein may be applied in a wide range of STM runtimes, in different embodiments.

Compilers typically instrument code that includes one or more atomic transactions by replacing loads and stores to shared memory from within the atomic transactions with calls to STM runtime routines. These routines are sometimes referred to as STM "barriers". In various embodiments, all of the STM bookkeeping work needed for ensuring isolation between concurrent transactions may be done inside these barriers. For example, for shared memory load instrumentation, such a barrier may typically perform several functions. First, a load (or read) barrier may ensure that it is safe for the transaction to access the target location in read-only mode. This may be done in a variety of different ways including (a) taking a snapshot of an "ownership record" (sometimes called an "orec") associated with the target location and verifying from the snapshot that no concurrent transaction can possibly be writing to the location, (b) acquiring read-ownership of the orec, or (c) checking a global timestamp to determine if a concurrent, possibly conflicting, transaction committed its updates in the interim (i.e. in the period of time between when the transaction accessed the location and when the transaction attempts to commit). While the optimization techniques described herein are presented in the context of ownership record based STMs, ones skilled in the art will appreciate that these techniques may be applicable even in STMs that do not require ownership records.

In some embodiments, a second function of the load barrier may be to log the location targeted by the load, and its corresponding STM state (e.g., a snapshot of its orec) in the enclosing transaction's "read set". In some embodiments, the load barrier may then check to see if the target address was previously written by the enclosing transaction. For example, this may involve a lookup in a write set summary bitmap or a write set implemented as a hash table, in some embodiments. If so, the load barrier may return the value written by the transaction (either from a transaction's redo log, or from the target location itself, in case of an implementation based on undo logs). Otherwise, it may execute some additional operations. For example, the load barrier may read the value of the location, and finally (in most cases), it may re-verify that the read was consistent with the prior snapshot of the location's STM state (which may be referred to as the "validation" step).

Similarly, for shared memory store instrumentation, a store (or write) barrier may typically perform the following functions. First, the STM store barrier may ensure that it is safe for the transaction to write to the target location. In various embodiments, this may be done by acquiring a lock in the target location's orec, or by taking a snapshot of the location's orec (e.g., in the case of implementations in which the transaction acquires ownership of the target location at commit time, which may be referred to as lazy ownership acquisition). In some embodiments, the store barrier may also log the target location's orec in the transaction's "write set" (which may be used to acquire and then release orec locks at commit time). In addition, the store barrier may either log the new value being written in the target location in the transaction's "redo log" (which may be used to flush out the transaction's "speculative writes" to the target locations when it commits), or may log the old value at the target location in the transaction's "undo log" (which may be used to roll back the transaction's speculative writes in the case that it aborts). In some embodiments, if the STM uses an undo log, the store barrier may write the new value in the target location as the final step of the barrier.

In various embodiments, STM optimizing compilers may further sub-divide STM barriers into two parts: a first part that is directed to ownership acquisition (which may include the first two functions of the STM read/write barriers described above), and a second part that is directed to read/write checking/logging (which may include the remaining functions of the STM read/write barriers described above). In such embodiments, the compiler may be able to "hoist" a single ownership acquisition operation on top of (i.e. cause it to be performed prior to) a group of read/write logging operations if the compiler can determine that the ownership acquisition "covers" the entire group (e.g., if the locations targeted by the group of read/write logging operations is associated with a single orec). In some embodiments, the compiler may elide multiple read logging operations if the compiler can determine that they all involve the same target location. As previously noted, typical compiler optimizations for write logging elision operate on the assumption that the STM runtime is an undo log based system. Under this assumption, the redundant write log operations may simply be replaced with a store instruction directed toward the target location. However, the optimizations described herein may also be applicable in systems that are not based on undo logs. Note that in some embodiments, compiler optimization techniques for transactional memory implementations may leverage general purpose compiler optimization techniques, such as common sub-expression elimination, constant propagation, loop-invariant hoisting, determining aliases, etc., to determine whether it is safe to elide redundant ownership acquisition and read/write logging operations for STM barriers.

The techniques described herein are directed to the read/write logging aspect of transactional memory compiler optimizations. As noted above, these techniques may be applied in a variety of STM runtimes, including undo log based STMs and redo log based STMs (which now dominate the state-of-the-art STM runtime space). By contrast, many of the STM read/write barrier elision optimizations previously proposed in the context of undo log STMs cannot be effectively applied to redo log based STMs. In fact, some of the previous techniques cannot even be applied correctly (much less efficiently) to redo log based runtimes. For example, the following C-like pseudo code depicts a concrete example of such a deficiency. This code includes a read-after-write scenario, in which a transaction writes to a location and then reads from it.

```
// sharedX is a global variable of type int (32 bit)
//
_transaction {
    // some code
    ...
    sharedX = foo( );
    // some more code
    ...
    bar = blah(sharedX);
    // more code
    ...
}
```

The source code above may be transformed to the following code by some previous transactional memory compilers:

```
Start:
Transaction txn = BeginTransaction( );
    // some instrumented code
    ...
    int tmp1 = foo( );
    AcquireWritePermission(txn, &sharedX);
    TranWrite32(txn, &sharedX, tmp1);
    // some more instrumented code
    ...
    AcquireReadPermission(txn, &sharedX);
    int tmp2 = TranRead32(txn, &sharedX);
    bar = blah(tmp2);
    // more instrumented code
    ...
if (!CommitTransaction(txn))
    goto Start;
```

Note that in this and other examples described herein, the functions AcquireReadPermission and AcquireWritePermission may be runtime routines for acquiring read ownership and write ownership of the target location, respectively (e.g., read ownership or write ownership of sharedX, in this example). In these examples, the functions TranRead32 and TranWrite32 may perform read set and write set checking/logging, respectively.

Some existing TM compiler optimizers can elide the AcquireReadPermission call, and replace the TranRead32 call with a direct read of sharedX. These optimizations are correct in the context of undo log based STMs. However, in the context of redo log based STMs, the TranRead32 call cannot be correctly elided because the logical value of sharedX (created by the previous write to sharedX) resides in the transaction's redo log. A similar restriction exists for transactional stores. As a result, with this existing TM compiler optimization technology, redundant TranRead and/or TranWrite calls cannot be correctly elided for STM runtimes that employ redo logs for transactional stores.

As with some existing TM compiler optimizations, the goal of the optimization techniques described herein is to elide as many STM read/write barriers as possible without compromising correctness. As discussed above, various optimization techniques may be directed to eliminating redundant ownership acquisition calls, eliminating read/write checking/logging calls, or both. In various embodiments, the compilers described herein may include optimization techniques directed to the elision of the read/write checking/logging calls. These techniques may in various embodiments include the caching of reads and writes of an atomic transaction in a thread local memory region (e.g., a thread stack), and the use of those cached reads and writes directly to elide redundant read/write logging calls whenever it is correct to do so. Note that those skilled in the art will appreciate that these techniques may be easily migrated to task-based concurrency frameworks, e.g., by reserving task-local memory regions to the same effect.

In some embodiments, the compiler optimizations described herein may leverage the API of a transactional memory compiler's transaction support library for calling STM read/write barriers. For example, in various embodiments, the API for such a transaction support library may include the following (or similar):

Acquire{Read/Write}Permission(Transaction txn, Address addr)—these functions may be configured to acquire the corresponding permissions, on behalf of the caller transaction, to access the target location 'addr'; and to update the transaction's read/write sets.

Tran{Read/Write}XX(Transaction txn, Address addr{, XX value})—these functions may be configured to perform the transactional read/write, on address 'addr', of size XX (wherein XX may be the size of the value in bits, and may be a multiple of 8, up to 64, for the various primitive types in C++, for example). This function may also perform logging the operation in the read set or the undo/redo log.

ValidateTransaction—this function may be configured to validate the transaction after a TranReadXX call.

Using the function calls above as examples, a compiler may inject AcquireReadPermission, TranReadXX, and ValidateTransaction calls in place of a transactional load of size XX, and AcquireWritePermission and TranWriteXX calls in place of a transactional store of size XX.

As noted above, the compiler optimizations described herein may target Tran{Read/Write}XX elision. More specifically, in some embodiments, whenever the compiler injects a Tran{Read/Write}XX call for a transactional load/store, it may also reserve a thread local memory location (e.g., a location on the current activation record of the thread stack) for the location being read/written, and may populate this "cached" copy of the location targeted by the load/store operation with the value read/written by the Tran{Read/Write}XX call. Thereafter, if the compiler determines (e.g., using existing redundant-STM-barrier-detection techniques, common sub-expression elimination, value numbering, etc.) that the same location is read or written by subsequent instructions in the transaction, the compiler may replace the corresponding Tran{Read/Write}XX call with a non-transactional load/store operation targeting the cached copy of that location.

One embodiment of a method for eliding transactional memory accesses is illustrated by the flow diagram in FIG. 1. As illustrated in this example, a compiler may access source code comprising an atomic transaction, as in 100, and may begin a static analysis of the code. For example, the source code for an application to be compiled may include a critical section identified by an "atomic" designation, or using another mechanism to identify a group of instructions that access shared memory locations or should for other reasons be executed atomically. In this example, when the compiler encounters an instruction within the atomic transaction that accesses a shared memory location (e.g., a location in a shared transactional memory), as in 110, it may be configured to determine whether the memory access is dominated or post-dominated by another access made by another instruction within the atomic transaction, as in 120. Note that, in the classic compiler optimizations notion, a statement A may be said to be dominated by a statement B if B lies on all control flow paths leading to A (e.g., from the entry block of the function that contains A and B to A). Alternatively, in the classic compiler optimizations notion, a statement A may be said to be post-dominated by a statement B if B lies on all control flow paths originating from A (e.g., all control flow paths from A to the exit block of the function that contains A and B). If the memory access is not dominated or post-dominated by another access within the atomic transaction, shown as the negative exit from 120, the compiler may generate a transactional access operation targeting the shared memory location, as in 130. For example, the compiler may replace a generic load or store operation with a transactional read or transactional write, which may in some embodiments include an operation to acquire the appropriate ownership of the targeted memory location and/or the logging of the access operation in the transaction's read or write set. If the memory access is the first read access targeting the shared memory location, shown as the positive exit from 140, the compiler may generate an operation to store the data that was read from the shared memory location (i.e. by a transactional read) in a thread-local copy of the shared memory location, as in 145. For example, in some embodiments, the compiler may cache the results of this read access in a temporary variable on the thread's stack, or in a block of memory local to the host thread, as described above.

If the memory access is dominated or post-dominated by another access within the atomic transaction, shown as the positive exit from 120, the compiler may generate a non-transactional access to a thread-local copy of the shared memory location (e.g., one created in response to encountering a previous access to the shared memory location), as in 125. As illustrated by the feedback from 150 to 110 in FIG. 1, the method may include repeating the operations illustrated as 110 to 145 for any other accesses to shared memory locations by instructions within the atomic transaction being analyzed. Once this static analysis has been completed for all accesses to shared memory locations by instructions within the atomic transaction, shown as the negative exit from 150, the compiler may output code that is executable to implement the atomic transaction, as in 160. For example, in some embodiments the compiler may output code that is executable to implement the application containing an identified critical section, and may replace the source code for that critical section with executable code that includes the transactional accesses, and the non-transactional loads and/or stores targeting thread-local copies of shared memory locations that were generated during the static analysis.

Figure 2:
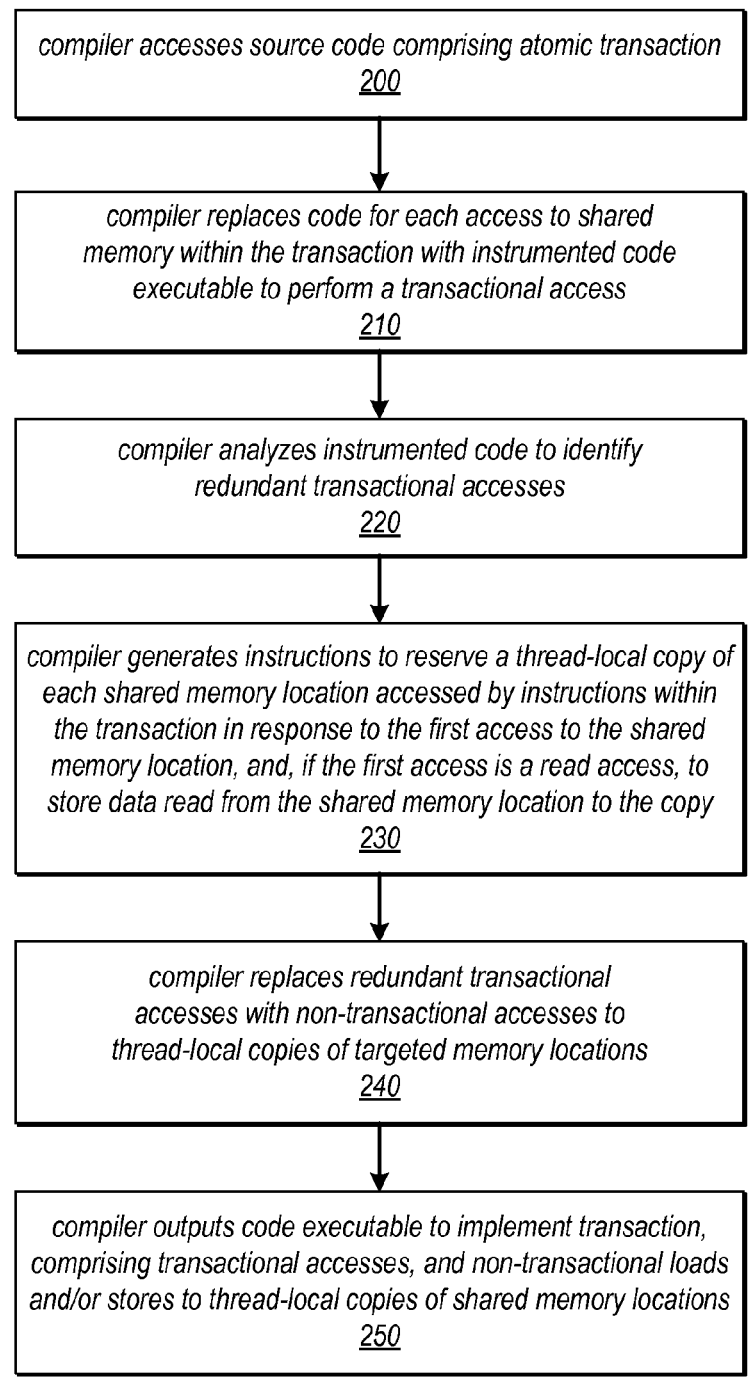
FIG. 2 is a flow diagram illustrating one embodiment of a method for instrumenting and optimizing transactional memory operations using static caching of memory objects, as described herein.

Note that in various embodiments, the operations of a compiler configured to optimize transactional memory operations using the static caching of memory objects may be performed in two or more passes and/or using two or more components (e.g., sub-modules) of the compiler. For example, in some embodiments, source code comprising an atomic transaction may be instrumented to perform transactional memory accesses during a first phase of a compilation exercise, and the static analysis described herein for eliding some of those transactional memory accesses may be performed during an optimization phase of the compilation exercise. FIG. 2 is a flow diagram illustrating one embodiment of a method for instrumenting and then optimizing transactional memory operations using static caching of memory objects. As illustrated in this example, in some embodiments, a compiler may access source code comprising an atomic transaction, as in 200, and may replace code for each access to shared memory within the atomic transaction with instrumented code that is executable to perform a transactional access, as in 210. As illustrated at 220, in this example, subsequent to instrumenting the code to perform these transactional accesses, the compiler may analyze the instrumented code to identify redundant transactional accesses, such as those described herein.

As illustrated in FIG. 2, the compiler may generate instructions to reserve a location in thread-local memory for each shared memory location accessed by instructions within the transaction in response to the first access to the shared memory location. In addition, if that first access is a read access (a transactional read), the compiler may generate instructions to store data that was read from the shared memory location by the first access (the transactional read) to that shared memory location in a thread-local copy of the shared memory location, as in 230, effectively caching that data in a location to be accessed by subsequent read and/or write operations to that shared memory location. For example, the compiler may replace redundant transactional accesses (i.e. both read and write accesses) to shared memory locations with non-transactional accesses to such thread-local copies of targeted memory locations, as in 240. Note that if the first access to a shared memory location from within the transaction is a write access, the corresponding location in thread-local memory may be reserved at that point, and the data to be written by the write access may be written (e.g., cached) to this thread-local memory location instead of to the targeted memory location itself. This thread-local memory location may then be accessed by any subsequent read and/or write accesses to the targeted memory location from within the transaction, including the first read access to the targeted memory location. Once the compiler has elided any eligible transactional accesses (and performed any other compilation, instrumentation, or optimization functions of the compiler), the compiler may output code that is executable to implement the atomic transaction, as in 250. As in the previous example, the code output by the compiler may in some embodiments be executable to implement an application containing an identified critical section, and may replace the source code for that critical section with executable code that includes the transactional accesses, and the non-transactional loads and/or stores targeting thread-local copies of shared memory locations that were generated during the static analysis.

The compiler optimization technique described above is described in more detail as follows, according to one embodiment. In this example, the compiler may always preserve the first TranReadXX call to a target location L within the dynamic extent of a transaction, unless there has been a previous TranWriteXX call to target location L. If the first access to target location L is a TranReadXX call, the compiler may also reserve a "shadow" copy of size XX on its thread local memory for L (referred to herein as L'), and may inject code that is executable to copy the value returned from TranReadXX to L'. This may ensure that the logical value of L is cached by the transaction for subsequent reuse. Note that if the first TranReadXX call to a target location L is dominated by a TranWriteXX call to target location L, the shadow copy may have already been reserved in the thread local memory for L. In this example, all subsequent TranReadXX( . . . , L) calls may be replaced with a direct load of L' until such time as it becomes unsafe to do so (as described below). In other words, as described above, a TranReadXX( . . . , L) call can be elided by the compiler if it is dominated by another TranReadXX( . . . , L) call or by a TranWriteXX( . . . , L, v) call. Note that elision of TranReadXX calls and AcquireReadPermission calls are orthogonal matters, and the latter is outside the scope of this disclosure.

Figure 3:
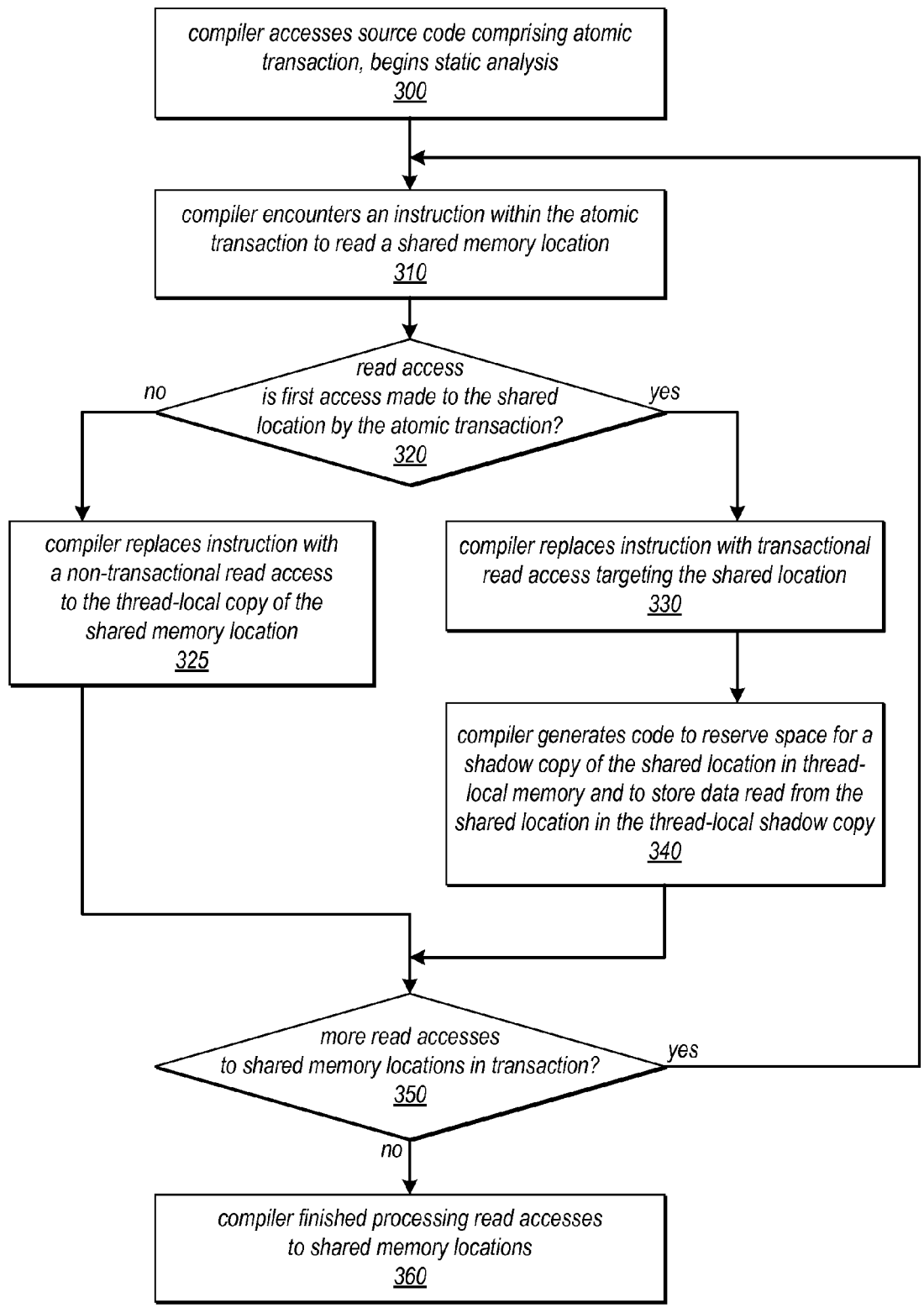
FIG. 3 is a flow diagram illustrating one embodiment of a method for eliding transactional read accesses, as described herein.

One embodiment of a method for eliding transactional read accesses is illustrated by the flow diagram in FIG. 3. As illustrated at 300, and described above, the method may include a compiler accessing source code comprising an atomic transaction, and beginning a static analysis of that source code. In this example, when the compiler encounters an instruction within the atomic transaction to read a shared memory location, as in 310, the compiler may be configured to determine whether this read access is the first access made to the shared memory location by instructions within the atomic transaction, as in 320. If so, shown as the positive exit from 320, the compiler may replace the instruction with a transactional read access targeting the shared memory location, as in 330, and may generate additional code that is executable to reserve space for a shadow copy of the shared location in thread-local memory and to store data that was read from the shared memory location in the thread-local shadow copy, as in 340.

If this read access is not the first access made to the shared memory location by instructions within the atomic transaction, shown as the negative exit from 320, the compiler may replace the instruction with a non-transactional read access to the thread-local shadow copy of the shared memory location (i.e. one reserved by a previous read access or reserved in response to a previous write access targeting the same shared memory location), as in 325. As illustrated by the feedback from 350 to 310 in FIG. 3, the method may include repeating the operations illustrated as 310 to 340 for any other read accesses to shared memory locations by instructions within the atomic transaction being analyzed. Once this static analysis has been completed for all read accesses to shared memory locations by instructions within the atomic transaction, shown as the negative exit from 350, the compiler has completed this portion of its analysis, as in 360.

In various embodiments, TranWriteXX call elision may be performed differently than TranReadXX call elision. For example, in one embodiment, if there are N TranWriteXX calls to update location L within the dynamic extent of a transaction, and if it is safe to do so, the first N−1 calls may be elided and replaced by N−1 stores to L', which is the shadow copy of L. However, the $N^{th}$ call to TranWriteXX( . . . , L, v) may be preserved, in this example. This may ensure that the last transactional store to L is made through the STM barrier. In other words, a TranWriteXX( . . . , L, $v_1$) call can be elided if it is post-dominated by another TranWriteXX( . . . , L, $v_2$) call. This aspect of the compiler optimization technique described herein may enable the approach to work correctly with undo log based STMs, since the last store to L is directed to L and any previous stores, which are redundant in this context, do not need to be directed to L. As previously noted, this technique also works correctly with redo log based STM runtimes.

Figure 4:
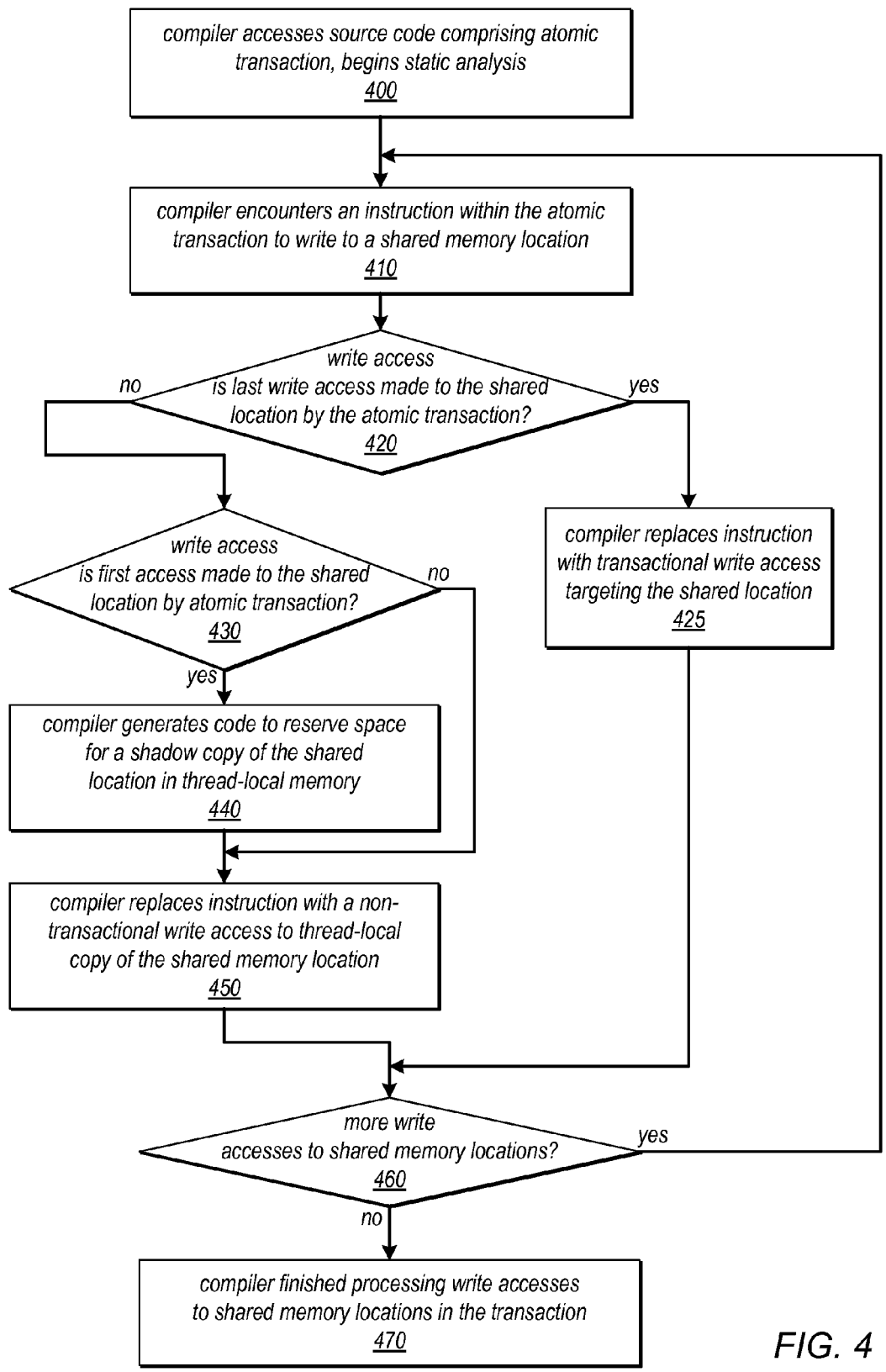
FIG. 4 is a flow diagram illustrating one embodiment of a method for eliding transactional write accesses, as described herein.

One embodiment of a method for eliding transactional write accesses is illustrated by the flow diagram in FIG. 4. As illustrated at 400, and described above, the method may include a compiler accessing source code comprising an atomic transaction, and beginning a static analysis of the code. In this example, when the compiler encounters an instruction within the atomic transaction to write a shared memory location, as in 410, the compiler may be configured to determine whether this write access is the last write access made to the shared memory location by instructions within the atomic transaction, as in 420. If not, shown as the negative exit from 420, the compiler may determine whether the write access is the first access made to the shared location by instructions within the atomic transaction, as in 430. If so, shown as the positive exit from 430, the compiler may generate additional code that is executable to reserve space for a shadow copy of the shared location in thread-local memory, as in 440. The compiler may then replace the instruction with a non-transactional write access targeting the thread-local shadow copy of the shared memory location, as in 450.

If this write access is the last write access made to the shared memory location by instructions within the atomic transaction, shown as the positive exit from 420, the compiler may replace the instruction with a transactional write access to the shared memory location, as in 425. As illustrated by the feedback from 460 to 410 in FIG. 4, the method may include repeating the operations illustrated as 410 to 450 for any other write accesses to shared memory locations by instructions within the atomic transaction being analyzed. Once this static analysis has been completed for all write accesses to shared memory locations by instructions within the atomic transaction, shown as the negative exit from 460, the compiler has completed this portion of its analysis, as in 470.

Note that in some embodiments, the compiler can also correctly move the TranWriteXX calls forward, which may be leveraged to batch multiple TranWriteXX calls (e.g., TranWriteXX calls for different target locations). In some embodiments, this kind of batching may enable other compiler optimizations to be applied to operations inside these TranWriteXX calls. For example, the compiler may in some embodiments inline the TranWriteXX calls, and then apply redundancy elimination techniques to eliminate redundancies between consecutive TranWriteXX calls. More specifically, consecutive updates to the redo/undo log will end up using the same registers for key STM runtime internal data structure components such as the index of the redo/undo log, the redo/undo log base address, etc., thus reducing register pressure and eliminating extraneous memory loads and stores.

In some embodiments, the STM runtime can provide a TranGroupWriteXX( . . . , locs[ ], vals[ ]) operation that takes an array of locations and corresponding values as inputs, and performs a composite N location TranWriteXX operation. This potentially eliminates N-1 TranWriteXX calls in cases in which the compiler is unable to inline all these calls, e.g., due to inlining budgeting constraints.

Note that in some embodiments, a shadow copy L', of location L that has been created in response to a call to TranReadXX for L, may also be used to elide redundant TranWriteXX calls targeted to location L. Similarly, a shadow copy L' created in response to a call to TranWriteXX may also be used to elide redundant TranReadXX calls targeted to L. This may be illustrated by the following example pseudo code:

```
_transaction {
    // some code
    ...
    // the rvalue of the next statement is generated in part from
    // location x
    .. = expr<x>;
    // more code
    ...
    // redundant write
    x = ..;
    // more code
    ...
    x = ..;
    // the rvalue of the next statement is generated in part from
    // location x
    //
    // redundant read
    .. = expr2<x>;
}
```

In this example, the code above may be transformed by the compiler into the following code:

```
Start:
Transaction txn = BeginTransaction( );
    // some code
    ...
    // the rvalue of the next statement is generated in part from
    // location x
    AcquireReadPermission(txn, &x);
    tmp1 = TranReadXX(txn, &x);
    ... = expr<tmp1>;
    // more code
    ...
    // redundant write
    AcquireWritePermission(txn, &x);
    tmp2 = ..;
    TranWriteXX(txn, &x, tmp2);
    // more code
    ...
    AcquireWritePermission(txn, &x);
    tmp3 = ..;
    TranWriteXX(txn, &x, tmp3);
    // the rvalue of the next statement is generated in part from
    // location x
    //
    // redundant read
    AcquireReadPermission(txn, &x);
    tmp4 = TranReadXX(txn, &x);
    .. = expr<tmp4>;
    if (!CommitTransaction(txn))
        goto Start;
```

In some embodiments, by using the Tran{Read/Write}XX elision strategy described herein and applying existing Acquire{Read/Write}Permission elision techniques, the resulting code can be further transformed by the compiler into the following code:

```
Start:
Transaction txn = BeginTransaction( );
    // some code
    ...
    // the rvalue of the next statement is generated in part from
    // location x
    AcquireReadPermission(txn, &x);
    tmp1 = TranReadXX(txn, &x);
    ... = expr<tmp1>;
    // more code
    ...
    AcquireWritePermission(txn, &x);
    // eliding redundant TranWriteXX call by reusing tmp1
    tmp1 = ..;
    // more code
    ...
    // AcquireWritePermission elided by other optimizations
    //
    // This is not a redundant transactional store, since it is
    // the last in this scope/transaction and post-dominates the
    // previous transactional store
    tmp1 = ..;
    TranWriteXX(txn, &x, tmp1);
    // the rvalue of the next statement is generated in part from
    // location x
    //
    // redundant read since this transactional load is dominated by
    // the previous transactional load; eliding AcquireReadPermission,
    // and TranReadXX calls
```

```
    .. = expr<tmp1>;
if (!CommitTransaction(txn))
    goto Start;
```

Note that, in the above example, the second TranReadXX call may be considered to be redundant, whereas the first TranWriteXX call may be considered to be redundant. Throughout this example, a common shadow copy of x (shown in the code as tmp1) may be used for Tran{Read/Write}XX call elision.

Figure 5:
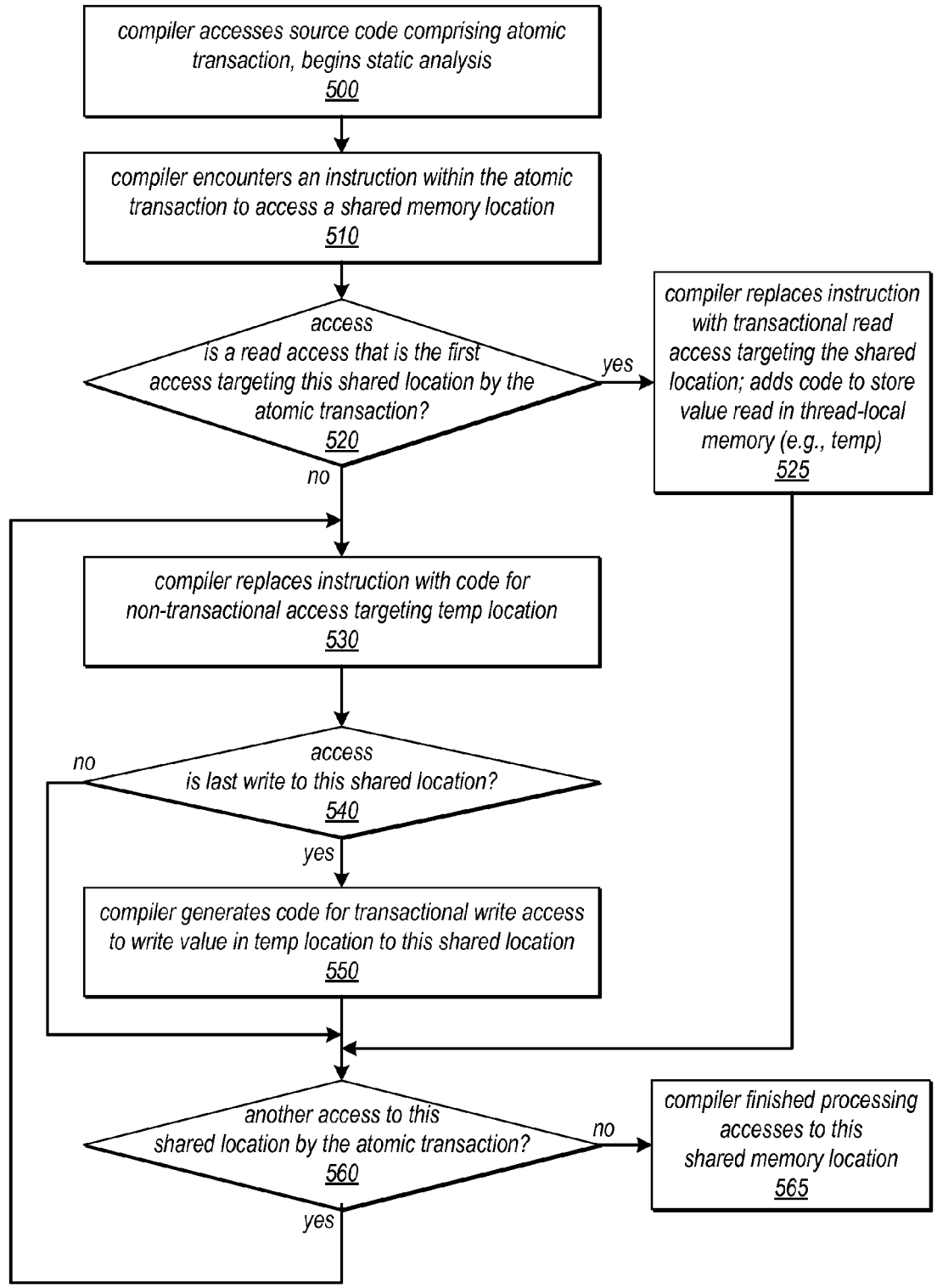
FIG. 5 is a flow diagram illustrating an example of the use of the techniques described herein for eliding transactional read accesses and/or transactional write accesses, according to one embodiment.

FIG. 5 is a flow diagram illustrating an example of the use of the techniques described herein for eliding at least some of the transactional read accesses and/or transactional write accesses of an atomic transaction. This example illustrates the actions taken by a compiler in response to encountering read and/or write accesses within a atomic transaction that target a given shared memory location, according to one embodiment. As illustrated at 500, the compiler may access source code comprising an atomic transaction, and may begin a static analysis of that code. In this example, the compiler encounters an instruction within the atomic transaction to access (e.g., to read or write to) a shared memory location, as in 510. In response, the compiler is configured to determine whether this access is a read access that is the first access made to the shared memory location by instructions within the atomic transaction, as in 520. If so, shown as the positive exit from 520, the compiler may replace the instruction with a transactional read access targeting the shared memory location, as in 525, and may generate additional code that is executable to store the data that was read from the shared memory location in thread-local memory (e.g., in a shadow copy of the memory location, shown in FIG. 5 as a variable called temp). If this access is not a read access that is the first access made to the shared memory location by instructions within the atomic transaction (e.g., if it is a second or subsequent read access, or is a write access), shown as the negative exit from 520, the compiler may replace the instruction with a non-transactional access to a thread-local shadow copy of the shared memory location (i.e. one reserved in response to the first read or write access targeting the shared memory location), as in 530.

If this access is the last write access made to the shared memory location by instructions within the atomic transaction, shown as the positive exit from 540, the compiler may generate additional code that is executable to perform a transactional write access to the shared memory location, as in 550, to copy the value of the thread-local temp variable to the shared memory location. As illustrated by the feedback from 560 to 530 in FIG. 5, the operations illustrated as 530 to 560 may be repeated if there are any additional accesses to this shared memory location by instructions within the atomic transaction. Once this static analysis has been completed for all accesses to this shared memory location by instructions within the atomic transaction, shown as the negative exit from 560, the compiler has completed this portion of its analysis, as in 565. Those of ordinary skill in the art will appreciate that these techniques may be applied by a compiler to atomic transactions that include read-after-read, read-after-write, write-after-read, or write-after-write patterns in the accesses made to a shared memory location.

The compiler optimization techniques described herein may be further illustrated by another, slightly more complicated, example found below. In this example, the transaction code is first shown in an instrumented form:

```
Start:
Transaction txn = BeginTransaction( );
// Case 1:
//
// read variable x1
AcquireReadPermission(txn, &x1);
tmp1_1 = TranReadXX(txn, &x1);
if (...) {
    // re-read x1
    AcquireReadPermission(txn, &x1);
    tmp1_2 = TranReadXX(txn, &x1);
} else {
    // no read of x1
}
// Case 2:
//
// read variable x2 inside a conditional statement
if (...) {
    AcquireReadPermission(txn, &x2);
    tmp2_1 = TranReadXX(txn, &x2);
} else {
    // no read of x2
}
// re-read x2
AcquireReadPermission(txn, &x2);
tmp2_2 = TranReadXX(txn, &x2);
// Case 3:
//
// write variable x3
AcquireWritePermission(txn, &x3);
TranWriteXX(txn, &x3, <expr1>);
if (...) {
    // re-write x3
    AcquireWritePermission(txn, &x3);
    TranWriteXX(txn, &x3, <expr2>);
} else {
    // no write to x3
}
// Case 4:
//
// write variable x4 inside a conditional statement
if (...) {
    AcquireWritePermission(txn, &x4);
    TranWriteXX(txn, &x4, <expr3>);
} else {
    // no write to x4
}
// re-write x4
AcquireWritePermission(txn, &x4);
TranWriteXX(txn, &x4, <expr4>);
if (!CommitTransaction(txn))
    // commit failed, restart transaction
    goto Start;
```

In some embodiments, the code above may be transformed by the compiler into the following code using the Tran{Read/Write}XX elision approach described herein:

```
Start:
Transaction txn = BeginTransaction( );
// Case 1:
//
// read variable x1
AcquireReadPermission(txn, &x1);
tmp1_1 = TranReadXX(txn, &x1);
if (...) {
    // re-read x1, read from tmp1_1 since this read is dominated
    // by the former read
    tmp1_2 = tmp1_1;
} else {
    // no read of x1
}
// Case 2:
//
// read variable x2 inside a conditional statement
//
// hoisted acquire read permission call (done using existing
// techniques)
```

```
AcquireReadPermission(txn, &x2);
if (...) {
    tmp2_1 = TranReadXX(txn, &x2);
} else {
    // no read of x2
}
// re-read x2; cannot elide this TranReadXX call since it is
// not dominated by a similar call
tmp2_2 = TranReadXX(txn, &x2);
// Case 3:
//
// write variable x3
AcquireWritePermission(txn, &x3);
// cannot elide this call since it is not post-dominated by a
// TranWriteXX(tx,. &x3, ...) call
TranWriteXX(txn, &x3, <expr1>);
if (...) {
    // re-write x3
    TranWriteXX(txn, &x3, <expr2>);
} else {
    // no write to x3
}
// Case 4:
//
// write variable x4 inside a conditional statement
//
// hoisted acquire write permission call (done using existing
// techniques)
AcquireWritePermission(txn, &x4);
if (...) {
    // tmp4_1 is the shadow copy of x4
    tmp4_1 = <expr3>;
} else {
    // no write to x4
}
// re-write x4
// update the cached shadow copy of x4
tmp4_1 = <expr4>;
// now do the TranWriteXX call since this write is not
// post-dominated by a TranWriteXX call for x4
TranWriteXX(txn, &x4, tmp4_1);
if (!CommitTransaction(txn))
    // commit failed, restart transaction
    goto Start;
```

Note that in some embodiments, there may be some difficulty in enforcing the Tran{Read/Write}XX elision method described so far in Case 2 and in Case 3 of the above pseudo code. However, in other embodiments, e.g., embodiments that employ some partially-redundant expression analysis, the compiler may move around the Tran{Read/Write}XX calls to enable the optimizations described above. For example, the Case 2 pseudo code may first be transformed into the following code:

```
// Case 2:
//
// read variable x2 inside a conditional statement
//
// hoisted acquire read permission call (done using existing
// techniques)
AcquireReadPermission(txn, &x2);
if (...) {
    tmp2_1 = TranReadXX(txn, &x2);
    // some code ...
    // re-read x2
    tmp2_2 = TranReadXX(txn, &x2);
} else {
    // read x2
    tmp2_2 = TranReadXX(txn, &x2);
}
```

In this example, the resulting code above may then be transformed into the following code:

```
// Case 2:
//
// read variable x2 inside a conditional statement
//
// hoisted acquire read permission call (done using existing
// techniques)
AcquireReadPermission(txn, &x2);
if (...) {
    tmp2_1 = TranReadXX(txn, &x2);
    // some code ...
    // re-read x2 (elide the TranReadXX call)
    tmp2_2 = tmp2_1;
} else {
    // read x2
    tmp2_2 = TranReadXX(txn, &x2);
}
```

Note that similar techniques may be applied to eliminate the redundant TranWriteXX call in Case 3, in some embodiments.

In some embodiments, some constraints may be made on the motion of Tran{Read/Write}XX calls in order to preserve correctness of program behavior. For example, in some embodiments, pushing TranReadXX calls from an if . . . else statement to the predecessor basic block, so as to eliminate redundant Tran{Read/Write}XX calls appearing after the if . . . else statements may not be allowed, because this may lead to data races that did not exist in the original program, e.g., if transactions are used to "publish" data from thread local to the shared data space. The following example pseudo code may be used to illustrate this situation. In this example, the original code may be as follows:

```
_transaction {
    if (ready) {
        val = data;
    }
    ...
    val1 = data;
}
```

In this example, it may be tempting to hoist the read of data above the if statement in order to be able to elide the redundant read of data. This would result in the following new code:

```
_transaction {
    tmp = data;
    if (ready) {
        val = tmp;
    }
    ...
    val1 = data;
}
```

However, this transformation may lead to data races if a thread "publishes" data concurrently (using a transaction) as in the example below. In this example, initially, data==42, ready==false, val==0.

```
Thread 1:                        Thread 2:
_transaction {
    tmp = data;
                                 data = 1;
                                 _transaction {
                                     ready = true;
                                 }
    if (ready) {
```

```
        val = tmp;
    }
    ...
    val1 = data;
}
```

Since this situation may lead to a data race, the question, "Can val==42?" may not have a clear answer.

In some embodiments, due to the nature of how STM runtimes behave, there may be certain restrictions on when redundant Tran{Read/Write}XX calls can be elided. Two primary concerns may involve opaque function calls and aliased accesses between two Tran{Read/Write}XX calls for the same shared variable. For example, in a scenario in which a shared variable x is read (using a TranReadXX call) by a transaction, which then makes an opaque function call (which can potentially update x) and then re-reads x (via a TranReadXX call), the second read of x cannot be elided. This is because the logical value of x is not guaranteed to be the same as the cached value of x (i.e. the value stored in its shadow copy during the first read of x), because the opaque function call might have changed it. Note that subsequent calls to TranReadXX for x can be elided if there are no intermediate opaque function calls. A similar restriction may exist for variables accessed via pointers. For example, if the compiler cannot guarantee that an intermediate pointer-based update is not directed to x, the compiler cannot assume that the value in x's shadow copy is its logical value. In such cases, the optimizer cannot elide the redundant TranReadXX calls across pointer based memory accesses. In short, opaque function calls (which may be referred to as "function blockades") and pointer-based aliased accesses (which may be referred to as "aliasing blockades") act as "blockades" for the Tran{Read/Write}XX (elision scheme described herein.

In some embodiments, the problem of aliasing blockades may be mitigated by standard alias analysis techniques. For example, some alias techniques rely on assertions from the programmer in the form of a command-line switch to the compiler to tell it something general about the sorts of aliases in the program. Such techniques may typically answer the question "is ptr A aliased with ptr B" with 'yes', 'no' or 'maybe'. These standard alias analysis techniques vary only in precision (i.e., in how often they answer 'maybe' when the true answer is 'no'), and in their performance costs (in terms of time and/or space).

Is some embodiments, in order to ignore an alias blockade for a given write through a pointer, the compiler may need to know that the pointer does not alias any other pointer in the current transaction. In such embodiments, if there are any aliases, the compiler cannot elide their corresponding Tran{Read/Write}XX calls across the alias blockade. Furthermore, the compiler must add TranWriteXX calls for all possible aliased pointers that have been elided up to this (alias blockade) point, and these must be called before the alias blockade under question. In such cases, the shadow copies of all the aliased variables that were written before the aliasing blockade must be invalidated. Aliasing blockades may in some embodiments effect efficient TranReadXX-from-pointer elision as well. If the pointer may alias another pointer (e.g., if the answer is yes or maybe), its shadow copy is itself redundant with respect to such yes-maybe aliases.

In some embodiments, an additional optimization for shared arrays, or pointer-accessed arrays in loops, may occur when it can be shown that there are no aliases among the pointers in the loop. In such cases, the compiler may use TranGroupReadXX calls to make a shadow copy of each array before the loop (e.g., in the pre-header block), may execute the loop without TranReadXX or TranWriteXX accesses, and then may use TranGroupWriteXX calls at the end of the loop to write back the new values of the array elements.

Figure 6:
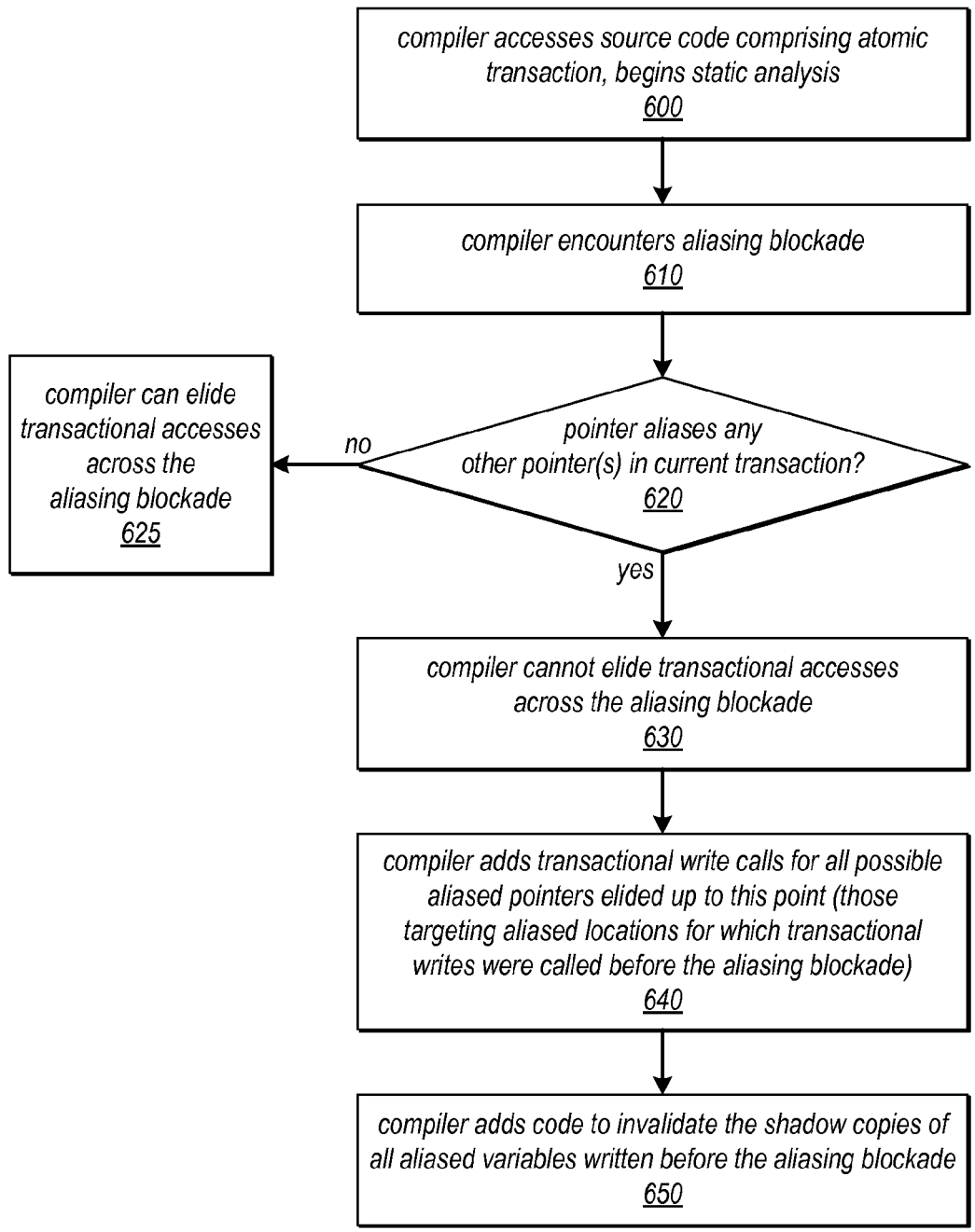
FIG. 6 is a flow diagram illustrating one embodiment of a method for determining whether transactional accesses can be elided across aliasing blockades, as described herein.

One embodiment of a method for determining whether transactional accesses can be elided across aliasing blockades is illustrated by the flow diagram in FIG. 6. As illustrated in this example, the method may include the compiler accessing source code comprising an atomic transaction, and beginning a static analysis of that code. As illustrated at 610 in FIG. 6, if the compiler encounters an aliasing blockade (as described above), it may be configured to determine whether the pointer aliases any other pointer(s) in the current transaction, as in 620. If not, shown as the negative exit from 620, the compiler may be configured to elide transactional accesses across this aliasing blockade, as in 625 (e.g., using various techniques described herein). If the compiler determines that the pointer aliases another pointer in the current transaction, shown as the positive exit from 620, the compiler may not be able to elide transactional accesses across this aliasing blockade, as shown in 630. In this case, the compiler may in some embodiments be configured to add code that is executable to implement transactional writes for all possible aliased pointers that have been elided up to this point (e.g., those targeting aliased locations for which transactional writes were called prior to encountering this aliasing blockade), as in 640, and/or to invalidate the shadow copies of all aliased variables written before encountering this aliasing blockade, as in 650. Note that in some embodiments, the operations illustrated in FIG. 6 may be repeated for other aliasing blockades encountered during a static analysis phase of a compilation exercise (not shown).

In some embodiments, various types of standard data-flow graphs and analyses may be used to track transactional loads and stores to shared memory locations and to determine which ones are redundant. Note that all data-flow graphs have notions equivalent to def-use, use-def and def-def chains (where "def" is a definition of a value for a variable, and "use" is a use of the value created by a reaching definition). In some embodiments, at each def point, if all targets of def-def chains are inside the transaction, then the TranWriteXX call for the former def can be elided. Otherwise the TranWriteXX call must be performed. In some embodiments, at function calls, which are implicit defs, all TranWriteXX calls must be performed, and their shadow locations invalidated (unless, for example, some inter-procedural analysis indicates which TranWriteXX calls can be safely elided). For non-implicit defs, if there is any reached use whose target is inside the transaction, the corresponding shadow location may need to be updated with the written value.

Figure 7:
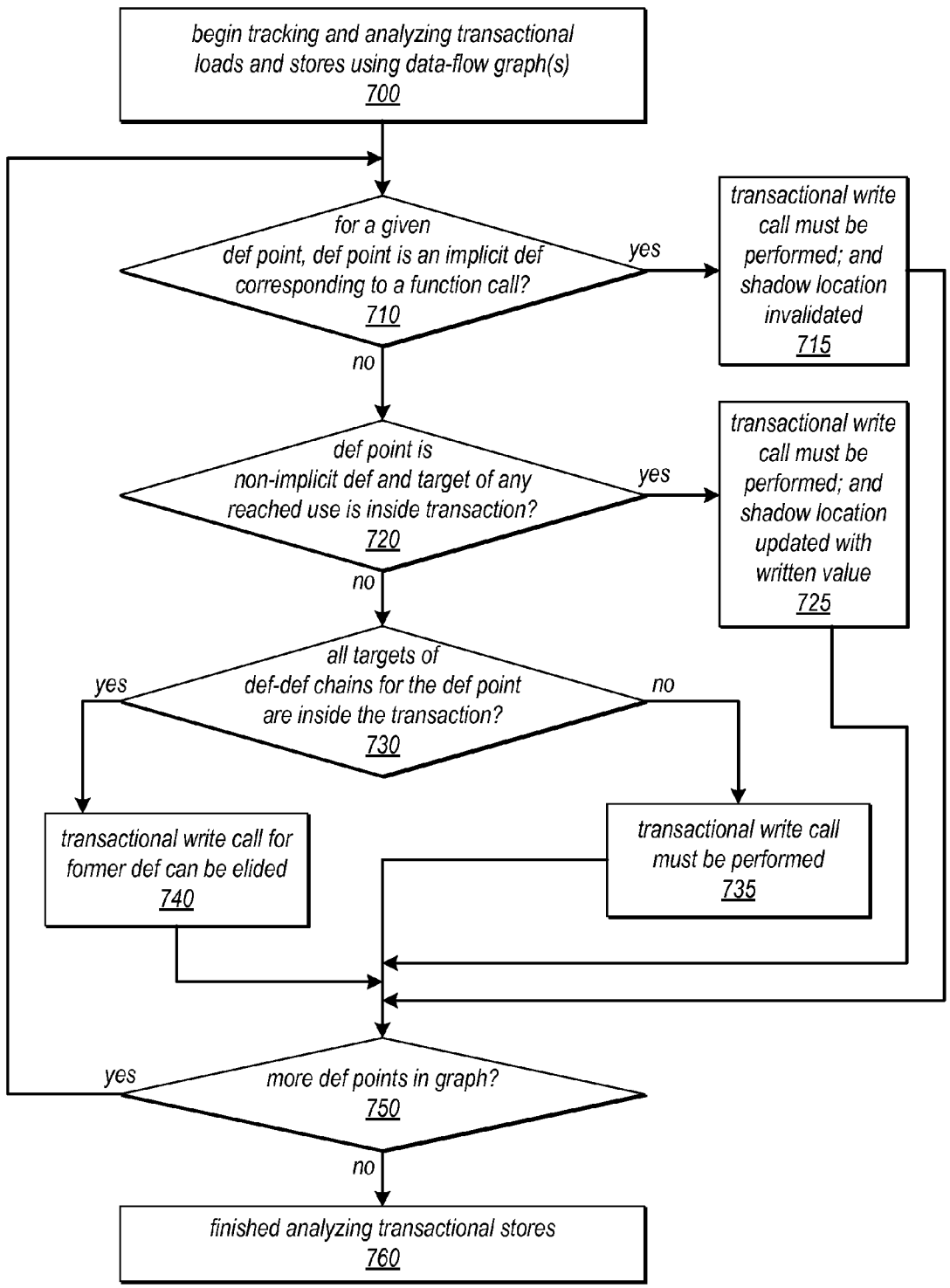
FIG. 7 is a flow diagram illustrating one embodiment of a method for determining whether transactional write accesses are redundant, as described herein.

One embodiment of a method for determining whether transactional write accesses are redundant (as described above) is illustrated by the flow diagram in FIG. 7. As illustrated at 700 in FIG. 7, the method may include tracking and analyzing transactional read and/or write accesses (i.e. transactional loads and stores) using data-flow graphs. In this example, if a given def point of such a data-flow graph is an implicit def corresponding to a function call, shown as the positive exit from 710, a transactional write call may need to be performed and any corresponding shadow location may need to be invalidated, as in 715. In other words, in this case, a transactional write access cannot be elided. Alternatively, if a given def point is a non-implicit def and the target of any reached use is inside the current transaction, shown as the positive exit from 720, a transaction write call may need to be performed and a shadow location corresponding to the target of the write may be updated with the value that was written, as in 725. Again, in this case, a transactional write access cannot be elided.

However, as described above, if all targets of def-def chains for a given def point are inside the current transaction, shown as the positive exit from 730, the transactional write call for the former def can be elided, as in 740. Otherwise, the transactional write call cannot be elided (i.e. it may need to be performed), as in 735. As illustrated by the feedback from 750 to 710 in FIG. 7, the analysis illustrated in 710-740 may be performed for each of the def points in a data-flow graph to determine which, if any, transactional write accesses can be elided. Once this analysis has been performed for each def point, shown as the negative exit from 750, this analysis may be complete, as in 760.

Note that for TranReadXX calls, a standard data-flow graph may not be usable because there are no use-use links. In some embodiments, the compiler may employ the following strategy. At each use point, the compiler may determine whether the shadow copy for that variable or location is valid in the current block. If so, the compiler may use the shadow copy. Otherwise, the compiler may determine whether the shadow copy is valid for all predecessor edges in the control-flow graph. If so, the compiler may mark the shadow copy as valid in this block, and may use it. Otherwise, the compiler may preserve the TranReadXX call, and may mark the shadow copy as valid in this block.

Figure 8:
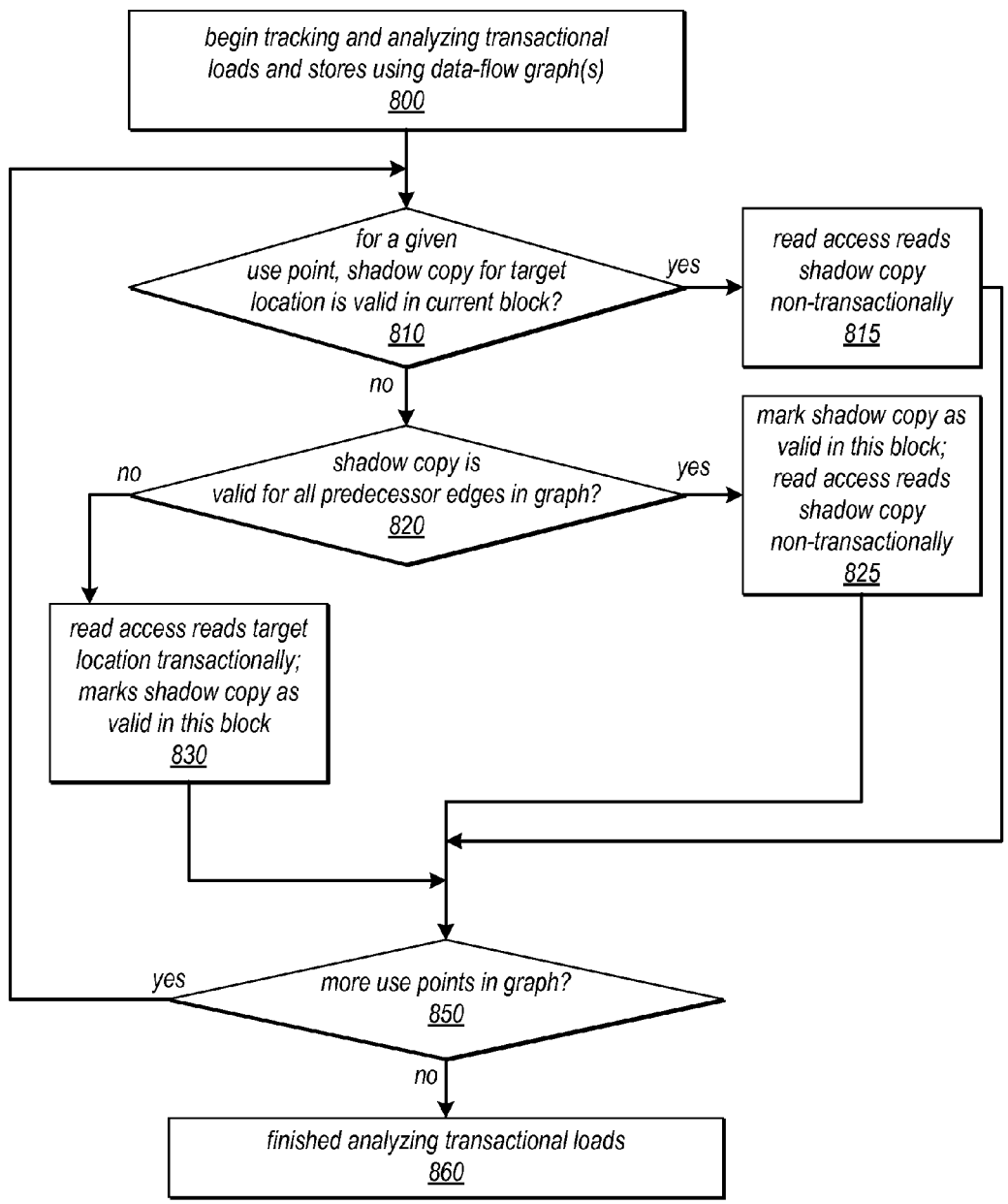
FIG. 8 is a flow diagram illustrating one embodiment of a method for determining whether transactional read accesses are redundant, as described herein.

One embodiment of a method for determining whether transactional read accesses are redundant (as described above) is illustrated by the flow diagram in FIG. 8. As illustrated at 800 in FIG. 8, the method may include tracking and analyzing transactional read and/or write accesses (i.e. transactional loads and stores) using data-flow graphs. In this example, for a given use point of such a data-flow graph, if the shadow copy of the target location is valid in the current block (shown as the positive exit from 810), a non-transactional read access may be used to read the shadow copy, as in 815. In other words, in this case, a transactional read access may be elided. As illustrated in this example, if the shadow copy is valid for all predecessor edges in the data-flow graph, shown as the positive exit from 820, the shadow copy may be marked as valid in this block, and a non-transactional read access may be used to read the shadow copy, as in 825. Again, in this case, a transactional read access may be elided.

However, if the shadow copy is not valid for all predecessor edges in the data-flow graph, shown as the negative exit from 820, a transactional read access may be used to read the target location, as in 830, and the shadow copy may be marked as valid in this block. In this case, a transactional read cannot be elided. As illustrated by the feedback from 850 to 810 in FIG. 8, the analysis illustrated in 810-830 may be performed for each of the use points in a data-flow graph to determine which, if any, transactional read accesses can be elided. Once this analysis has been performed for each use point, shown as the negative exit from 850, this analysis may be complete, as in 860.

Figure 9A:
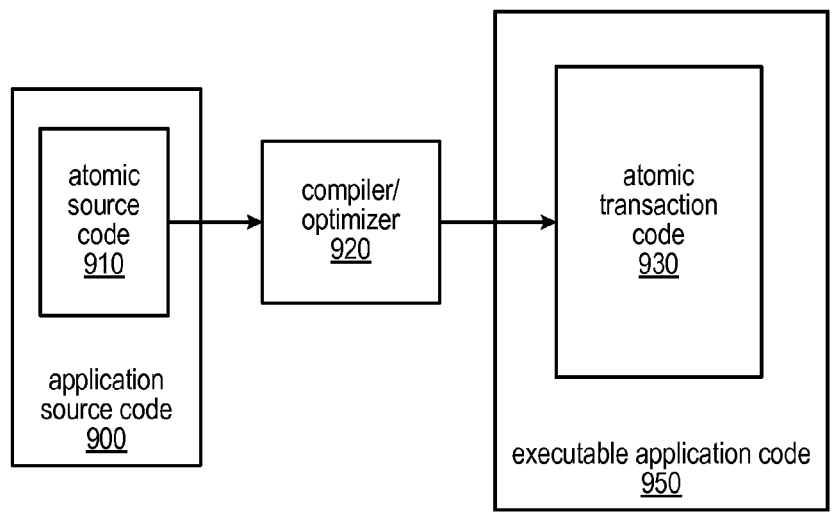
FIGS. 9A and 9B are block diagrams illustrating the compilation of application source code into executable application code, according to various embodiments.

FIG. 9A is a block diagram illustrating the use of a compiler/optimizer 920 to analyze application source code 900, and to generate atomic transaction code 930 as part of executable application code 950, according to one embodiment. In this example, compiler/optimizer 920 may be configured to replace programmer written code (such as in atomic source code 910), which is to be executed atomically, with alternate code that may include some transactional load and/or store operations targeting shared memory locations, and may also include some non-transactional load and/or store operations targeting shared memory locations, as described herein. For example, a programmer may write the source code for an application, such as application source code 900, using atomic blocks to specify sets of instructions that should be executed atomically and/or as a transaction. Compiler/optimizer 920 may be configured to identify sets of instructions or other fragments or portions of an application (e.g., functions, objects, method, classes, etc) by recognizing any of various language constructs that may be used to designate those instructions, fragments or portions to be executed atomically, and to generate code to ensure that they are executed atomically.

In some embodiments, programmers may write transaction code using familiar coding styles, but the transaction may be effected according to particular transactional memory implementation techniques. The transaction code written by the programmer may be translated, replaced or transformed (e.g., by compiler/optimizer 920) into code that is configured to implement transactions according to one or more of various software, hardware, or hybrid transactional memory techniques supported by the execution environment (e.g., the operating system and/or underlying memory subsystem hardware). For example, in some embodiments, transaction code written by the programmer may be transformed into executable code that includes operations to reserve thread-local memory locations as shadow copies of those shared memory locations (and in which results of load and store operations that target those shared memory locations may be cached), and that includes non-transactional access to those shadow copies where transactional accesses would be redundant. In this example, compiler/optimizer 920 may apply various instrumentation techniques and various optimizations in single pass (or using a single, multi-function software module) to produce the compiled application code.

While described herein in terms of a compiler, compiler/optimizer 920 may represent other entities configured to generate atomic transaction code 930, according to different embodiments. For example, in one embodiment, compiler/optimizer 920 may represent a just-in-time (JIT) compiler. In general, compiler/optimizer 920 may represent any entity capable of and configured to generate atomic transaction code for implementing transaction methods, as described herein. While described herein as various software entities, compiler/optimizer 920 may, in some embodiments, represent a hardware-based entity configured to generate atomic transaction code for implementing transaction methods. Note that in other embodiments, some or all of the functions described above as being performed by a compiler or compiler/optimizer, or by software generated on the basis of a compiler analysis, may instead be performed in hardware. In such embodiments, there may be no need for a compiler to produce code that explicitly causes these functions to be performed.

Application source code 900 and/or atomic source code 910 may represent program instructions in any of various languages, according to various embodiments. For example, in some embodiments, atomic source code 910 may represent code written in a high level programming language, such as C, C++, or Java™. In other embodiments, atomic source code 910 may represent binary instructions or assembly instructions. In yet other embodiments, atomic source code 910 may also represent compiler-intermediate instructions or virtual machine byte code instructions, such as Java™ byte code instructions.

In some embodiments, atomic transaction code 930 may be configured to utilize and/or include one or more libraries of transaction enabling code, such as a transaction support library (not shown). In various embodiments, atomic transaction code 930 and/or a transaction support library may include functionality to execute transactions according to various software transactional memory techniques. For example, in some embodiments, atomic transaction code 930 may include the functionality to begin and end transactions according to various software transactional memory techniques. In another example, atomic transaction code 930 may make calls into a transaction support library for beginning and committing software transactions, and/or for performing one or more memory access. Additional functionality, such as the ability to support self-abort and/or nesting in transactions, may be provided by functions of a transaction support library, in some embodiments.

Figure 9B:
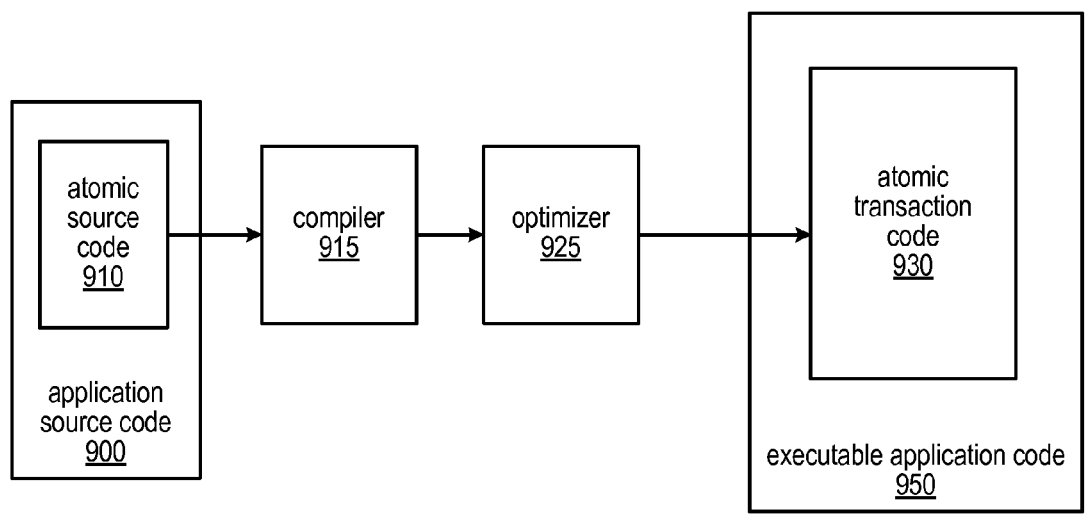

FIG. 9B is a block diagram illustrating the use of a compiler 915 and a separate optimizer 925 to generate atomic transaction code 930 from atomic source code 910, according to one embodiment. In this example, transaction code written by a programmer as part of application source code 900 may be instrumented by compiler 915 to implement transactional reads and/or writes, and then optimized by optimizer 925 to elide one or more transactional reads and/or writes using the caching techniques described herein. As described herein, the optimization phase may include optimizer 925 replacing some transactional load and/or store operations that target shared memory locations with non-transactional load and/or store operations, as described herein. In some embodiments, optimizer 925 may generate executable code that includes operations to reserve thread-local memory locations as shadow copies of shared memory locations (and in which results of load and store operations that target those shared memory locations may be cached), and that includes non-transactional access to those shadow copies where transactional accesses would be redundant.

As in the example illustrated in FIG. 9A, compiler 915 and/or optimizer 925 may represent various entities configured to (collectively) generate atomic transaction code 930, including just-in-time compilers, other software entities, or hardware-base entities, according to different embodiments. As in the example illustrated in FIG. 9A, application source code 900 and/or atomic source code 910 may represent program instructions in any of various languages, according to various embodiments, and atomic transaction code 930 may include calls to functions provided by a transaction support library (not shown). In the example illustrated in FIG. 9B, compiler 915 may apply various instrumentation techniques and may output compiled, instrumented code. Optimizer 925 may then apply various optimizations as part of a separate optimization phase of the compilation exercise. For example, optimizer 925 may apply the transactional access elision techniques described herein, and may also apply other optimizations (e.g., common sub-expression elimination, constant propagation, loop hoisting, etc.) Note that in some embodiments, these and/or other optimizations may also be applied by the compiler/optimizer 920 illustrated in FIG. 9A.

Figure 10:
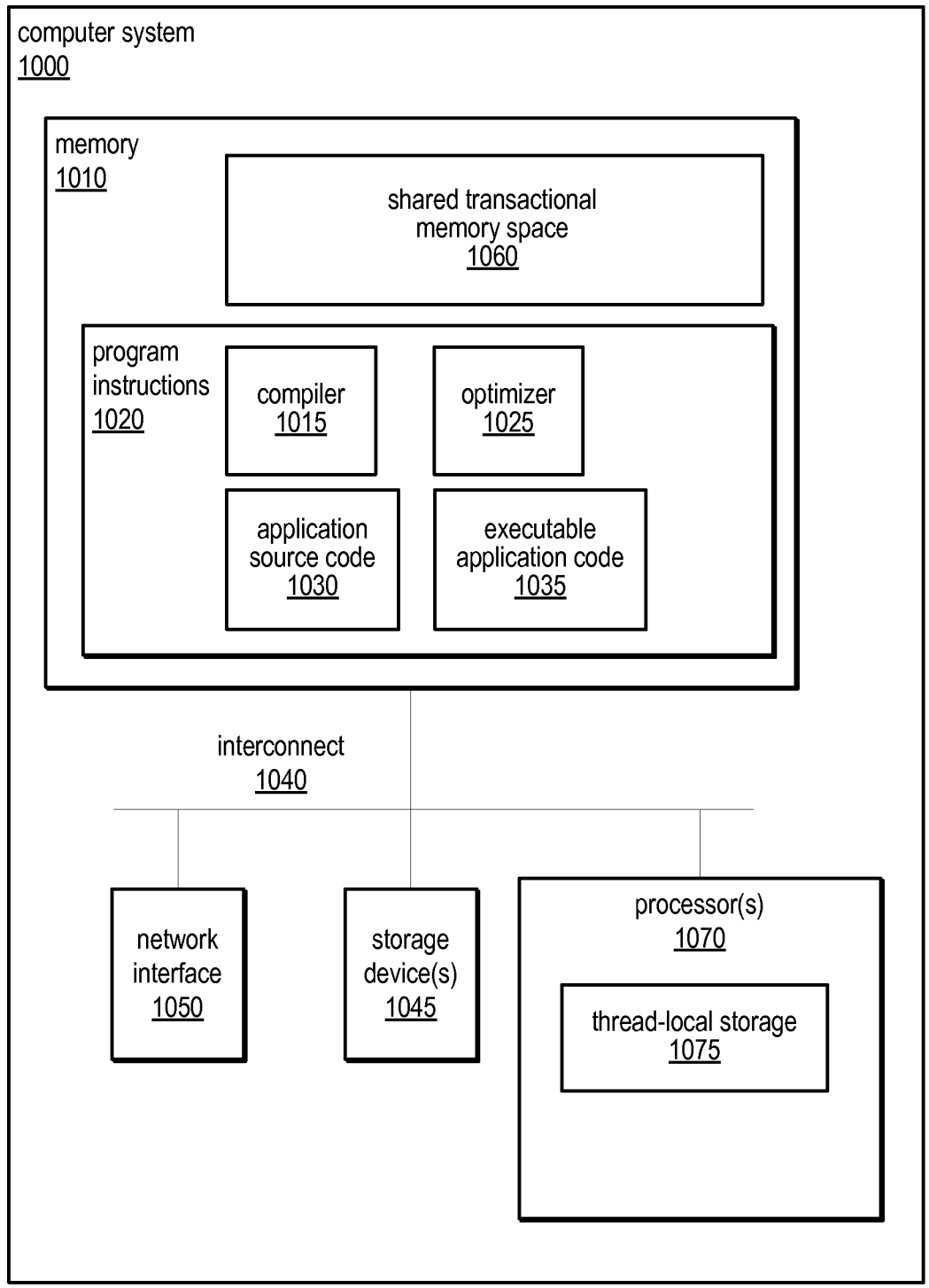
FIG. 10 is a block diagram illustrating one embodiment of a computer system configured to implement a software transactional memory and mechanisms for optimizing transactional memory operations using static caching of memory objects, as described herein.

The techniques described herein for optimizing transactional memory operations using static caching of memory objects may be implemented in any of a wide variety of computing systems. FIG. 10 illustrates a computing system configured to optimize transactional memory operations using static caching of memory objects, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software, that may include a non-transitory, computer-readable storage medium having stored thereon instructions, which may be used to program a computer system (or other electronic devices) to perform the techniques described herein. A computer-readable medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1070 (possibly including multiple processors, a single-threaded processor, a multi-threaded processor, a multi-core processor, etc.). As described herein, processor 1070 may in some embodiments include thread-local storage 1075, in which results of various accesses to shared memory locations (e.g., locations in shared transactional memory space 1060) may be cached. The computer system 1000 may also include one or more system memories 1010 (e.g., one or more of cache, SRAM DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and one or more storage device(s) 1045 (e.g., optical storage, magnetic storage, etc.). The memory medium may include other types of memory as well, or combinations thereof. In other embodiments, computer system 1000 may include more, fewer, or different components than those illustrated in FIG. 10 (e.g., video cards, audio cards, additional network interfaces, peripheral devices, etc.). The processor unit 1070, the storage device(s) 1045, the network interface 1050, and the system memory 1010 may be coupled to the system interconnect 1040.

One or more of the system memories 1010 may include program instructions 1020 configured to implement a compiler 1015 and an optimizer 1025 (or a combination compiler/optimizer, as described herein) that is configured to provide executable functional sequences for optimizing transactional memory operations using static caching of memory objects. Additionally, one or more of the system memories 1010 may include application source code 1030 (including code configured to request or specify atomic transactions) and/or executable application code 1035, as described herein. In some embodiments, program instructions 1020 may also be configured to implement a transaction support library, which provides various methods for implementing atomic transactions (not shown).

In various embodiments, compiler 1015, optimizer 1025, application source code 1030, and/or executable application code 1035 may each be implemented in any of various programming languages or methods. For example, in one embodiment, compiler 1015 and/or optimizer 1025 may be JAVA based, while in another embodiments, they may be written using the C or C++ programming languages. Similarly, application source code 1030 may be written using Java, C, C++, or another programming language, according to various embodiments. Moreover, in some embodiments, compiler 1015, optimizer 1025, and application source code 1030 may not be implemented using the same programming language. For example, application source code 1030 may be C++ based, while compiler 1015 may be developed using C.

As illustrated in FIG. 10, memory 1010 may also include a shared transactional memory space 1060, which may support and/or be accessed by transactions in a software transactional memory implementation, a hardware transactional memory implementation, and/or a hardware-software hybrid transactional memory implementation, in different embodiments. In some embodiments, memory 1010 may include one or more shared storage locations that are accessible by two or more transactions executing in computer system 1000.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
    performing, by a computer:
        analyzing source code that comprises a sequence of instructions to be executed as an atomic transaction, wherein the sequence of instructions comprises instructions for performing a plurality of accesses to a shared memory location as part of the atomic transaction, wherein the shared memory location is accessible to a plurality of atomic transactions; and
        replacing the sequence of instructions with an alternate sequence of instructions to be executed as an atomic transaction, wherein the alternate sequence of instructions performs the plurality of accesses and is executable to implement within the atomic transaction:
            storing results of one or more of the accesses to the shared memory location in a shadow location in thread-local memory, wherein said storing comprises storing in the shadow location a value to be written to, or read from, the shared memory location, based on the one or more accesses;
            performing one of the accesses of the original sequence of instructions to the shared memory location using a non-transactional memory access within the atomic transaction that targets the shadow location; and
            performing a different one of the accesses to the shared memory location using a transactional memory access that targets the shared memory location.

2. The method of claim 1, wherein said analyzing comprises determining, for each of the plurality of accesses to the shared memory location, whether performing the access using a transactional memory access would be redundant with respect to another one of the plurality of accesses to the shared memory location.

3. The method of claim 2, wherein one of the plurality of accesses to the shared memory location is a read access, and wherein determining whether performing the read access using a transactional memory access would be redundant comprises determining whether the read access is dominated by a previous read or write access to the shared memory location.

4. The method of claim 3, wherein in response to determining that performing the read access using a transactional memory access would be redundant, said replacing comprises replacing the instruction to perform the read access with an instruction to perform a non-transactional read access that targets the shadow location.

5. The method of claim 3, wherein in response to determining that performing the read access using a transactional memory access would not be redundant, said replacing comprises replacing the instruction to perform the read access with an instruction to perform a transactional read access that targets the shared memory location.

6. The method of claim 5, wherein said replacing further comprises adding to the alternate sequence of instructions an instruction to perform storing the result of the transactional read access in the shadow location.

7. The method of claim 2, wherein one of the plurality of accesses to the shared memory location is a write access, and wherein determining whether performing the write access using a transactional memory access would be redundant comprises determining whether the write access is post-dominated by a subsequent write access to the shared memory location.

8. The method of claim 7, wherein in response to determining that performing the write access using a transactional memory access would be redundant, said replacing comprises replacing the instruction to perform the write access with an instruction to perform a non-transactional write access that targets the shadow location.

9. The method of claim 7, wherein in response to determining that performing the write access using a transactional memory access would not be redundant, said replacing comprises replacing the instruction to perform the write access with an instruction to perform a transactional write access that targets the shared memory location.

10. The method of claim 1, wherein the alternate sequence of instructions is further executable to implement acquiring read or write ownership of the shared memory location.

11. The method of claim 1, wherein one of the accesses to the shared memory location is a write access, and wherein performing the write access using a transactional memory access that targets the shared memory location comprises storing the previous value of the shared memory location in an undo log of the atomic transaction or storing the value being written to the shared memory location in a redo log of the atomic transaction.

12. A system, comprising:
one or more processors; and
memory coupled to the one or more processors, wherein the memory comprises program instructions executable by the one or more processors to implement a compiler; wherein the compiler is configured to:
analyze source code that comprises a sequence of instructions to be executed as an atomic transaction, wherein the sequence of instructions comprises instructions for performing a plurality of accesses to a shared memory location as part of the atomic transaction, wherein the shared memory location is accessible to a plurality of atomic transactions; and
replace the sequence of instructions with an alternate sequence of instructions to be executed as an atomic transaction, wherein the alternate sequence of instructions performs the plurality of accesses and is executable to implement within the atomic transaction:
storing results of one or more of the accesses to the shared memory location in a shadow location in thread-local memory, wherein said storing comprises storing in the shadow location a value to be written to, or read from, the shared memory location, based on the one or more accesses;
performing one of the accesses of the original sequence of instructions to the shared memory location using a non-transactional memory access within the atomic transaction that targets the shadow location; and
performing a different one of the accesses to the shared memory location using a transactional memory access that targets the shared memory location.

13. The system of claim 12,
wherein said analyzing comprises determining, for each of the plurality of accesses to the shared memory location, whether performing the access using a transactional memory access would be redundant with respect to another one of the plurality of accesses to the shared memory location; and
wherein determining whether performing the access using a transactional memory access would be redundant comprises determining whether the access is one of: a read access that is dominated by a previous read or write access to the shared memory location or a write access that is post-dominated by a subsequent write access to the shared memory location.

14. The system of claim 13, wherein in response to determining that performing the access using a transactional memory access would be redundant, said replacing comprises replacing the instruction to perform the access with an instruction to perform a non-transactional access that targets the shadow location.

15. The system of claim 13, wherein in response to determining that performing the access using a transactional memory access would not be redundant, said replacing comprises replacing the instruction to perform the access with an instruction to perform a transactional access that targets the shared memory location.

16. The system of claim 15, wherein the access is a read access, wherein the transaction access is a transactional read access, and wherein said replacing further comprises adding to the alternate sequence of instructions an instruction to perform storing the result of the transactional read access in the shadow location.

17. A non-transitory, computer-readable storage medium, storing program instructions that when executed on one or more computers cause the one or more computers to perform:
analyzing source code that comprises a sequence of instructions to be executed as an atomic transaction, wherein the sequence of instructions comprises instructions for performing a plurality of accesses to a shared memory location as part of the atomic transaction, wherein the shared memory location is accessible to a plurality of atomic transactions; and
replacing the sequence of instructions with an alternate sequence of instructions to be executed as an atomic transaction, wherein the alternate sequence of instructions performs the plurality of accesses and is executable to implement within the atomic transaction:
storing results of one or more of the accesses to the shared memory location in a shadow location in thread-local memory, wherein said storing comprises storing in the shadow location a value to be written to, or read from, the shared memory location, based on the one or more accesses;
performing one of the accesses of the original sequence of instructions to the shared memory location using a non-transactional memory access within the atomic transaction that targets the shadow location; and
performing a different one of the accesses to the shared memory location using a transactional memory access that targets the shared memory location.

18. The storage medium of claim 17,
wherein said analyzing comprises determining, for each of the plurality of accesses to the shared memory location, whether performing the access using a transactional memory access would be redundant with respect to another one of the plurality of accesses to the shared memory location; and
wherein determining whether performing the access using a transactional memory access would be redundant comprises determining whether the access is one of: a read access that is dominated by a previous read or write access to the shared memory location or a write access that is post-dominated by a subsequent write access to the shared memory location.

19. The storage medium of claim 18, wherein in response to determining that performing the access using a transactional memory access would be redundant, said replacing comprises replacing the instruction to perform the access with an instruction to perform a non-transactional access that targets the shadow location.

20. The storage medium of claim 18,
wherein in response to determining that performing the access using a transactional memory access would not be redundant, said replacing comprises:

replacing the instruction to perform the access with an instruction to perform a transactional access that targets the shared memory location; and if the access is a read access, adding to the alternate sequence of instructions an instruction to perform storing the result of the transactional access in the shadow location.

\* \* \* \* \*